United States Patent [19]
Wells

[11] Patent Number: 5,099,456
[45] Date of Patent: Mar. 24, 1992

[54] PASSIVE LOCATING SYSTEM

[75] Inventor: Donald R. Wells, Villa Park, Calif.

[73] Assignee: Hughes Aircraft Company, Los Angeles, Calif.

[21] Appl. No.: 537,544

[22] Filed: Jun. 13, 1990

[51] Int. Cl.[5] ............................................... G01S 3/80
[52] U.S. Cl. .................................................... 367/127
[58] Field of Search ................. 367/124, 125, 127, 129

[56] References Cited

U.S. PATENT DOCUMENTS

| | | | |
|---|---|---|---|
| 4,312,053 | 1/1982 | Lipsky | 367/127 |
| 4,333,170 | 6/1982 | Mathews et al. | 367/125 |
| 4,686,655 | 8/1987 | Hyatt | 364/724.01 |

*Primary Examiner*—Daniel T. Pihulic
*Attorney, Agent, or Firm*—Wanda K. Denson-Low

[57] ABSTRACT

A passive surveillance system provides ranging and location capability of a signal source. A single receiver in a multipath environment or alternatively a plurality of receivers receive the signal from the source having different propagation delays along different paths. Selection of corresponding frequency components from different paths and mixing of the corresponding selected frequency components from each of the paths generates complex pseudo-noise signals that are suitable for correlation processing. Correlation processing of the mixed signals yields the time difference between the multiple paths. The maximum time difference parameters for each path are used to generate a locus line, either explicitly or implicitly. Range and location processing of the locus information identifies range and location of the signal source.

20 Claims, 2 Drawing Sheets

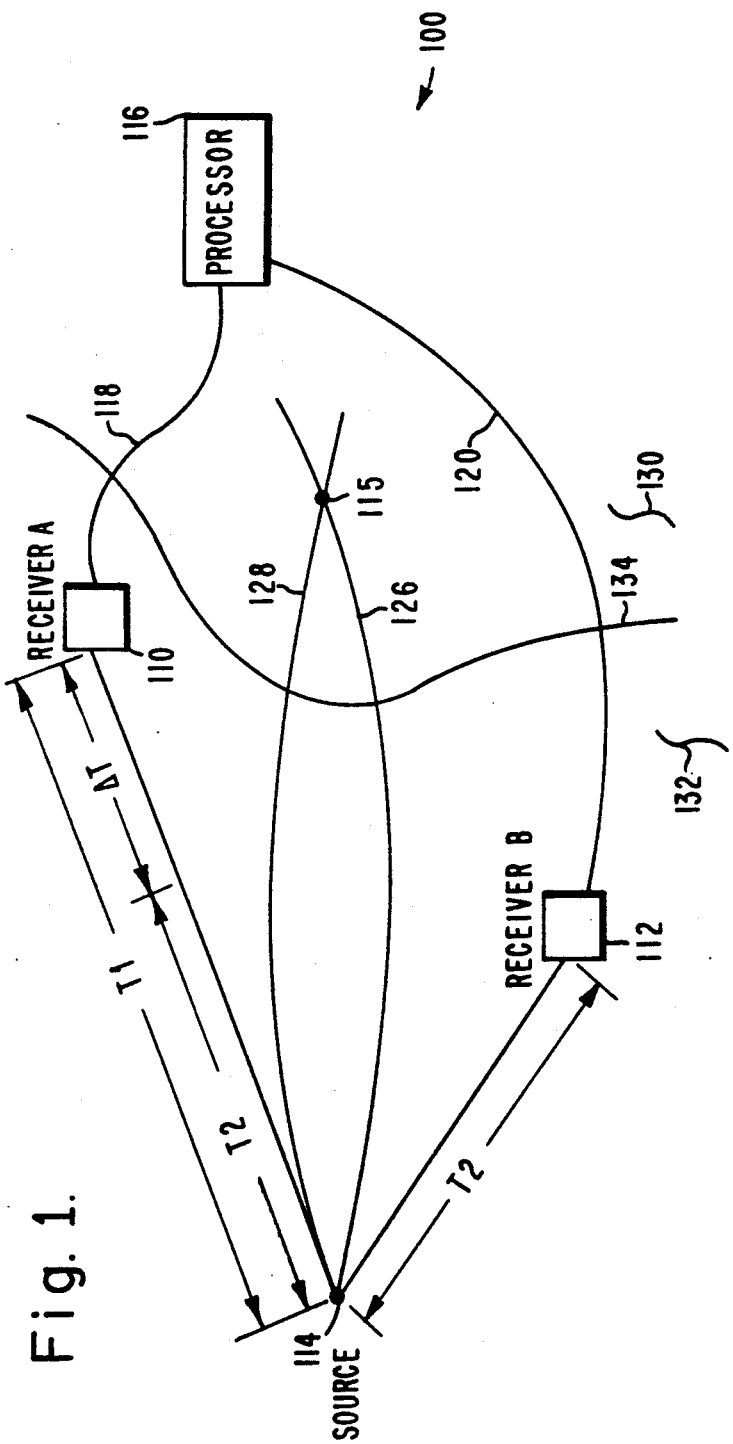
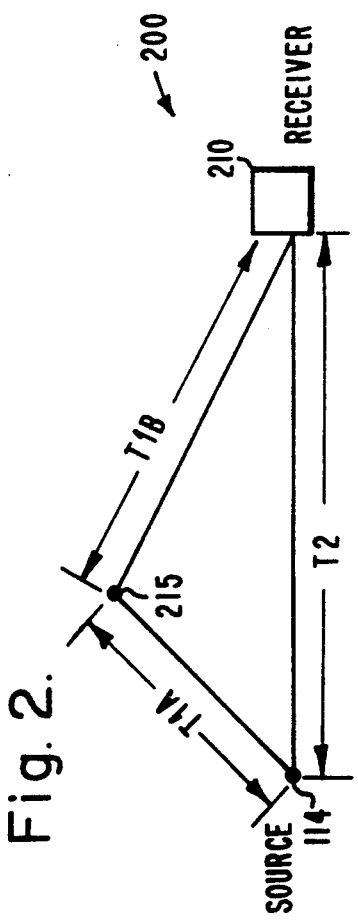

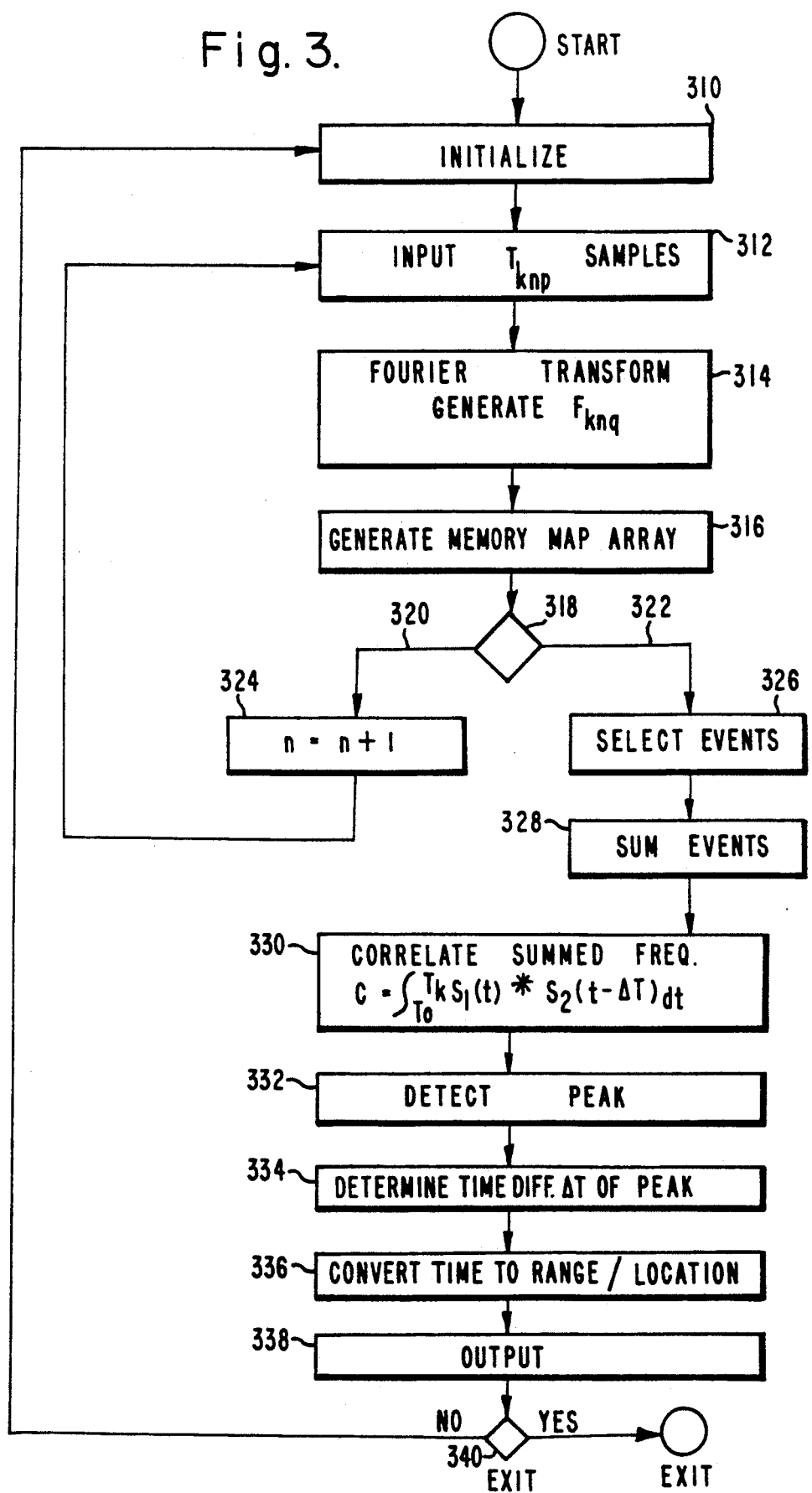

PASSIVE LOCATING SYSTEM

BACKGROUND

The field of the invention is passive surveillance systems and, in particular, locating capabilities for underwater acoustic passive surveillance systems.

An underwater surveillance system utilizes a sparse array of underwater sensor nodes spread over a critical area of operational importance. A significant problem with his system is the large amount of data produced by a single field and the very large quantity of noise and unwanted clutter that must be analyzed by a human operator. In essence, each node of the field must be interpreted by an operator to determine which signals are clutter and which may be signals of interest. This is very time consuming and automatic methods of sorting signals and clutter would help save resources.

One approach to eliminating clutter is to segregate all lines associated with a specific platform no matter what the nature of the platform. Then that platform is classified using one or more lines and other expert and collateral information with operators or expert systems. All lines from that source can be placed in a clutter map or track file depending upon its importance. Clutter lines can then be removed from all node displays within the field of view of the sources and alerts automatically sent to other nearby nodes for similar responses.

Acoustic passive ranging is not possible on a single array or between two arrays without ambiguities unless noise like acoustic signals are employed. Using wide band receivers to achieve a noise like signal for interarray or interbeam triangulation lowers the signal to noise ratio. Also, each beam or array, pointing in different directions, may receive different noise signals in an ocean environment.

Accordingly, it is a feature of the present invention to provide synthesis of a noise like signal that can be used for ranging of passive signals emanating from a target such as a submarine. A noise like signal is required for interarray processing for determining target range by triangulating. Individual sonar frequencies that are detectable may not be noise like and ambiguities would result.

Accordingly, it would be an advance in the art to have a passive surveillance system that provides location information related to sources of signals, and that can automatically locate sources of signals.

SUMMARY OF THE INVENTION

In accordance with the present invention, there is provided an arrangement for combining narrowband signals from a common source to create a noisy signal that can produce unambiguous, or less ambiguous, autocorrelation functions for interarray processing. The present invention uses the psuedo-noise method to develop discriminants of narrowband signals. The autocorrelation function of several lines from a common platform provides a single unambiguous maximum in a small field. This function then provides a combined signature for these lines from the platform.

This invention will help passive sonar arrays determine target range by triangulation, either among two or more arrays or among two or more beams of a single array where multipath has taken place by reflection from a known boundary. This new technique can facilitate range detection using a single vertical array in certain applications where processing of a direct path signal and a surface bounce signal is possible.

The present invention provides an arrangement to locate sources of signals in a passive surveillance system. In particular, this invention is particularly suitable for determining the range and direction or location, in addition to the detection and identification, of an acoustic source in an underwater acoustic passive surveillance system. The present invention provides an arrangement for combining narrow band (tone-line) signals from a common source to create noise-like or pseudo-noise signals for reduced location ambiguity.

In a preferred embodiment, a locating system has a receiver for generating digital time domain signal samples related to a signal source, a transform processor for generating digital frequency domain signal samples in response to the digital time domain signal samples, an adder circuit for generating digital summed frequency domain signal samples by selectively adding a plurality of digital frequency domain signal samples, a time difference processor for generating time difference signal samples by processing the digital summed signal samples, and a location processor for generating a location parameter defining location of a signal source in response to the time difference signal samples.

BRIEF DESCRIPTION OF THE DRAWINGS

The foregoing and other features and advantages of the present invention will become apparent from the following detailed description taken in conjunction with the accompanying drawings, wherein like references numerals designate like structural elements, and in which:

FIG. 1 is a block diagram representation of a multiple receiver passive surveillance environment in accordance with the principles of the present invention;

FIG. 2 is a block diagram representation of a single receiver multipath passive surveillance environment in accordance with the principles of the present invention; and FIG. 3 is a flow diagram of a passive surveillance location program in accordance with the principles of the present invention.

DETAILED DESCRIPTION

For a general description of underwater acoustic passive surveillance systems, see the article "Advances In Antisubmarine Warfare" by Joel S. Wit, Scientific American, February 1981.

Passive surveillance systems are conventionally implemented without a transmitter, using a receiver for receiving acoustic signals generated by sources, a digital filter for filtering the received acoustic signals, and a display for displaying the filtered signals. An operator, who is skilled in recognizing events, monitors the display for events of interest. Such systems are effective for identifying sources of signals, but are relatively ineffective for determining the range to sources of signals.

Present ranging systems use two arrays having a known relative geographic positions that are suitable for triangulation. It is necessary that coherence between the two array signals be retained for a minimum length of time for triangulation. Still, even under ideal conditions in which strong coherent signals exist for a sufficient duration, target location ambiguities result.

An acoustic receiver is conventionally implemented with an acoustic transducer to generate an electrical analog transducer signal in response to the acoustic signal, an amplifier to amplify the electrical analog transducer signal, and an analog to digital converter (ADC) to generate digital time domain samples in response to the amplified analog transducer signal.

A digital filter for passive surveillance is conventionally implemented with a Fourier transform processor executing a fast Fourier transform (FFT) algorithm to generate digital frequency domain signal samples in response to the digital time domain signal samples generated by the ADC. The frequency domain signal samples are conventionally stored in a memory as an array of digital samples having a frequency that is indicated by the location or address of the digital sample in the memory array and having a magnitude that is indicated by the magnitude of the digital number stored in the memory location or address.

The display is conventionally implemented as a waterfall display, where each one of multiple transforms are displayed as a horizontal line of frequency domain samples that is vertically spaced apart from other transformed horizontal lines with increasing time vertically downward. When an event of interest is detected by the operator, he attempts to identify and to located the event. An event can be identified by the signature of the event, which is conventionally characterized by the intensity and frequency pattern. Signatures are conventionally used to discriminate between surface ships and submarines and are conventionally used to identify types of surface ships and submarines.

A source locating capability in accordance with the present invention involves multiple spaced apart receivers (FIG. 1) or alternatively a single receiver in a multipath environment (FIG. 2) together with a signal processing capability to selectively combine and correlate multiple frequency components from a single signal source.

The location of an object is often determined by methods such as triangulation. Several readings are taken from diverse positions and the locus from each position is plotted. The point of intersection of the loci is the location of the object.

FIG. 1 shows a passive surveillance environment 100 for illustrating a multiple receiver configuration. Multiple sources, such as the source 114, typically exist in an environment 100. For example, many submarines, surface ships, and other signal sources may exist in the environment and generate acoustic signals. Two diversely located receivers, receiver A 110 and receiver B 112, receive acoustic signals. The received signals are preprocessed, such as by amplification, and communicated to a processor 116. The processor 116 may be located in the proximity of one of the receivers 110, 112 or may be located remote from both receivers 110, 112. Signals are communicated from the receiver 110 along the data line 118 to the processor 116 and signals are communicated from the receiver 112 along the data line 120 to the processor 116.

The processor 116 is shown located on land 130, the receivers 110, 112 are shown located in the ocean 132, and the data links 118, 120 are shown communicating information from the ocean 132 to the land 130 across the coastline 134.

FIG. 2 shows a passive surveillance environment 200 for illustrating a multipath configuration. The features discussed with reference to FIG. 1 also apply to the simplified environment shown in FIG. 2. A single receiver 210 is shown receiving acoustic signals generated by the source 114 directly along the first path T2 and indirectly along the second paths T1A and T1B. The element 215 is shown as a reflector, such as the water surface or an underwater object, for reflecting the acoustic signal incident from the source 114 along the path T1A as the reflected acoustic signal along the path T1B to the receiver 210. The received signals from the path T1B and the path T2 are preprocessed and subsequently filter processed and location processed.

The system may include well known beamforming capability to limit the directionality of the receivers. As shown in FIG. 1, the time (related to the distance) from the source 114 to receiver A 110 is T1 and the time (related to the distance) from the source 114 to the receiver A 112 is T2. Similarly, as shown in FIG. 2, the direct time (related to the direct distance) from the source 114 to the receiver 210 is T2 and the indirect time (related to the indirect distance) from the source 114 to the receiver 210 is T1 where $T1=T1A+T1B$. The time T1 from the source 114 to the receiver 110, 210 is shown longer than the time T2 by delta-T (DT) from the source 114 to the receiver 112, 210 where the relationship $DT=T1-T2$ defines the relative times.

The location implementation discussed below generates locus lines associated with the value of DT, herein discussed as hyperbolic locus lines 126, 128 (FIG. 1) for convenience of illustration. Signals received by the first receiver, receiver A 110, are used to generate a first locus line 126. Signals received by the second receiver, receiver B 112, that is diversely located or alternatively a multipath signal are used to generate a second locus line 128 that intersects the first locus line 126 at the true source 114. Locus lines 126, 128 may also intersect at a second point 115. However, the use of beamforming, which is well known in the passive surveillance art, by receiver A 110 and by receiver B 112 can be used to determine the direction of the source and hence can be used to identify point 114 as the source. Also, the intersection 115 can often be discarded based upon other criteria. For example, intersection 115 may occur on land, as shown in FIG. 1, and hence can be characterized as an erroneous source. Also, additional diversely located receivers or additional multipath signals can be used to select the source by generating additional locus lines which would intersect the locus lines 126, 128 at or near the source 114 to resolve possible ambiguity of the source location.

The locus lines 126, 128 can be determined by comparing the signals for a match. Such a comparison is conventionally implemented by correlation. See U.S. Pat. No. 4,686,655, which is herein incorporated by reference. Cross correlation of a first signal T1 with a second signal T2 will generate a peak output signal at a time related to the difference in T1 and T2 or alternatively at a time related to DT. This DT determination is used to generate the locus lines 126, 128 and to locate the source 114. The correlation equation is $C(t) = \int S1(t) * S2(t-DT) dt$.

As discussed in U.S. Pat. No. 4,686,655, the samples of the S1(t) signal are compared with the corresponding samples of the S2(t) signal for different positions of the S2(t) signal relative to the S1(t). For each relative position of the S1(t) signal and the S2(t) signal, corresponding signal samples are multiplied together and the product signal sample are added together to generate a correlated signal sample C(t). The S1(t) signal may be shifted past the S2(t) signal, corresponding samples of the S1(t) signal and the S2(t) signal are multiplied together to generate product signal samples, and all product signal samples for each position of the S2(t) signal relative to the S1(t) are added together to generate a correlated signal sample for that shift position. The value of DT in the above correlation equation identifies the relative position of the S1(t) signal and the S2(t) signal.

Many of the events of interest generate repetitive signals, such as repetitive propeller signals from a surface ship or from a submarine. Narrow band signals, such as generated by a Fourier transform processor, are effectively tones or sinusoidal signals. As is well known in the art, cross correlation of repetitive signals, such as sinusoidal signals, does not generate a correlation peak that is indicative of time difference. A good correlation peak is achieved with noisy signals or noise-like signals. An important feature of the present invention is the generation of more complicated noise-like signals by mixing multiple repetitive signals from the same source. Such more complicated signals can be generated to be sufficiently noise-like to facilitate good cross correlation. This is achieved by identifying two or more suitable signal components or events from the same source, mixing these suitable signal components or events together, and then performing a cross correlation operation. The more suitable tones that can be identified and utilized in the processing, the more complex is the processed signal and the better the processing results.

Suitability of selected events should be common to all of the paths. In a FIG. 1 configuration, the selected events should be common to all receivers. For example, the events selected from a waterfall display associated with a first receiver should be seen on and should be selected on the waterfall displays associated with the second receiver and associated with any other receivers in the system. In a FIG. 2 configuration, the selected events should be common to all paths. For example, the events selected from a waterfall display associated with a first path should be seen on and should be selected on that same waterfall display in a different form related to the second path. Second, signals should not be harmonically or integrally related, in that the frequencies should not be integer multiples of each other. Third, the tones should have relatively high signal to noise ratio (SNR). This is because the higher the SNR, the higher the correlation peak. Hence, an operator selecting tones from a waterfall display for mixing should select tones associated with the same source, where two of the tones should be reasonably closely spaced and a third tone (if available) should be less closely spaced in the horizontal or frequency direction and the selected tones should be bright in intensity (high SNR). Although it is desirable to select tones having the above suitability criteria, it is not required that the tones be ideally suitable meeting all of the suitability criteria. It should be noted that the present invention will operate better if suitable signals are selected. However, the present invention will still operate even if less suitable signals are selected.

Automatic selection can be made using the same suitability criterion. The information presented on the waterfall display (intensity vs frequency vs time) is available in memory to an automatic selection program. Hence, the same criteria used by an operator may be programmed to operate on a computer, if desired. Also, artificial intelligence or expert system technology may be used to provide even more adaptability.

The effects of mixing suitable tones is well known in the art. See the book entitled The Fourier Transform by R. Buzlewell (McGraw Hill). Mixing of two suitable tones generates an amplitude modulated beat frequency that is equal to the difference of the frequencies of the two tones. Mixing of three suitable tones generates a more complex amplitude modulated beat frequency that has an occasional peak signal occurring at a time that is related to the difference of the frequencies of the three tones and that is near Gaussian in form. Mixing of four or more suitable tones yields a distribution that is very close to Gaussian. Hence, the more the quantity of suitable tones from the same source that are mixed, the more complex is the signal and hence the more effective is the cross correlation processing.

FIG. 3 is a flow diagram illustrating the operations for generating ranging and location information concerning a source. It may be implemented with equipment under operator control or it may be implemented with automatic equipment, if desired. Automatic equipment may be implemented with conventional array processors, such as manufactured by Floating Point Systems, Analogic, CSPI, and others, and can be implemented with digital signal processor and array processor chip sets, such as manufactured by Texas Instruments Inc., Analog Devices Inc., INMOS, Sky Computers Inc., Bipolar Integrated Technology Inc., Weitek Corp., and others. Alternatively, the arrangement shown in FIG. 3 may be implemented with special purpose hardwired processors and logic. The arrangement shown in FIG. 3 may also be implemented with combinations of special purpose hardwired processors and logic and softwired processors, if desired. Large libraries of software routines are available for such processors, including Fourier transform, correlation, pattern recognition, and other routines.

Arrays of samples will be discussed with subscripts for ease of illustration. The subscript "k" designates the number of each of a plurality of receivers. The subscript "n" designates the number of each of a sequence of time intervals or apertures, such as corresponding to a horizontal line on a waterfall display. The subscript "p" designates the number of each of a sequence of time domain samples in a time interval or aperture. The subscript "q" designates the number of each of a sequence of frequency domain samples in a spectrum, such as spectral frequency domain samples generated by a transform of time domain samples.

Operation begins with the circle operation labeled START, proceeds through the various processing operations, and concludes with the circle labeled EXIT. The processing is initialized in the INITIALIZE operation 310. The aperture counter, which counts the number of apertures "n" in the scenario, is initialized in the INITIALIZE operation 310. An array of time domain samples $T_{knp}$ for each receiver "k" and for the particular aperture "n" are acquired in the INPUT operation 312. Various implementations of acquiring of time domain samples are well known in the art. For example, time domain samples can be acquired from each receiver by inputting the transducer samples that are converted to digital samples by the ADC in each receiver to the processor and storing the input samples from each receiver in an array of time domain samples for each aperture "n" in the memory of the processor. For this example, the time domain samples associated with each receiver are stored in an array that is separate from the arrays of time domain samples associated with each other receiver. Hence, there are "k" arrays of time domain samples, each array having "n" apertures of time domain signals. For a FIG. 2 configuration using multipath signals, the value of "k" is unity for a single receiver.

The time domain samples $T_{knp}$ for each aperture "n" of each receiver "k" are transformed to frequency domain samples $F_{knp}$ for each aperture "n" and for each receiver "k" in the FOURIER TRANSFORM operation 314 and are arranged into a memory map array in the GENERATE MEMORY MAP ARRAY operation 316. Various implementations of time domain to frequency domain transformation are well known in the art; such as fast Fourier transforms and discrete Fourier transforms. The frequency domain samples can be stored in an array of frequency domain samples for each transformed aperture "n" of each receiver "k". To facilitate a waterfall display for an operator or waterfall type processing for a processor, the arrays of frequency domain samples $F_{knp}$ for each receiver (subscript "k") can be stored in a two dimensional array of frequency domain samples for each aperture (subscript "q") in the horizontal direction and apertures as scan lines (subscript "n") in the vertical direction. The frequency domain samples for each receiver can be stored and displayed separate from the frequency domain samples for each other receiver in a system having a group of "k" different receiver storage and display systems. Each of the storage systems can store the frequency domain samples in an aperture for the related receiver "k" as samples of increasing frequency toward the right and the apertures can be stored and displayed as increasing time toward the bottom. The magnitude of each frequency domain sample $F_{knp}$ is stored in the memory address associated with the aperture line in the array (subscript "n") and with the sample in the aperture line (subscript "q"). A two dimensional memory map is well known in the art, implementing parameters stored in a digital memory as a map of a two dimensional image having up, down, right, and left equivalent directions. Such a memory map, implemented separately for each receiver, can be displayed using conventional raster scan display monitors. The memory map can be used as a conventional refresh memory for refreshing the display with lines of apertures having pixels of frequency domain samples within an aperture line. A separate memory map and display can be provided for each receiver.

A program test is made in the test operation 318 to detect if the array of apertures has been filled. If not filled, the program proceeds along path 320 to the N=N+1 operation 324 to increment the aperture counter and then the program loops back to the INPUT operation 312 to acquire another aperture of samples for each receiver. When the array is filled, the program proceeds along path 322 to the SELECT EVENTS operation 326 to select the events to be summed and to SUM EVENTS operation 328 to sum the selected events.

In accordance with the present invention, it is desirable to select two or more suitable events common to each signal path from the source. For example, in a FIG. 1 configuration, three events common to all of a plurality of waterfall displays will be selected. These three events will probably have a similar intensity pattern on each of the plurality of displays and will probably have the same frequency values (horizontal position) on each of the displays. Similarly, in a FIG. 2 configuration, three events common to all of a plurality of different paths seen on the same display will be selected.

The events can be selected in various ways. In a manual selection configuration, an operator views the waterfall displays, evaluate the images based upon well known identification criteria, and select events with operator input devices, such as a keyboard operated cursor, a light pen, a touch screen, a keyboard, or other operator selection device. In an automatic selection configuration, a processor is implemented to compare the memory maps of the waterfall images and select the events based upon well known criterion. For example, the processor can preliminarily select events based upon a threshold criteria and can then finally select the events based upon a spatial correlation between the different memory maps for a FIG. 1 configuration or based upon a spatial correlation of a single memory map for a FIG. 2 configuration. Pattern recognition algorithms are well known in the art and can be used to select suitable events. Artificial intelligence processors, inference processors, and expert systems are well known in the art and can also be used to automatic select suitable events.

The selected event samples are summed in the SUM EVENTS operation 328, the summed samples are correlated in the CORRELATE operation 330, the correlation peaks is detected in the DETECT PEAK operation 332, and the time associated with the correlation peaks is determined in the DETERMINE TIME DIFFERENCE operation 334. The summed samples are frequency domain samples. The sample to sample (aperture to aperture) variation represents a time variation and hence the summed samples may be considered to be time domain samples. In a FIG. 1 configuration, the selected events for each aperture line are summed together and are stored as a set of time domain summed event samples for each receiver. Hence, a set of time domain samples, one sample per aperture line, are stored for each receiver. Similarly, in a FIG. 2 configuration, the selected events for a path signal for each aperture line are summed together and are stored as a set of time domain summed event samples for each path. Hence, a set of samples, one sample per aperture line, are stored for each path. Each set of time domain summed samples are cross correlated with each other set of time domain summed samples and the correlation peaks are detected as being indicative of the delta-T parameter between the paths. The position of the correlation peak in the sequence of output samples defines the time delay and the delta-T parameter. For example, in a FIG. 1 configuration having two receivers, the set of time domain summed samples associated with the first receiver is cross correlated with the set of time domain summed samples associated with the second receiver and the correlation peak is detected as being indicative of the DT parameter between the two paths. Similarly, in a FIG. 2 configuration having a direct path and an indirect path, the set of time domain summed samples associated with the direct path is cross correlated with the set of time domain summed samples associated with the indirect path and the correlation peak is detected as being indicative of the DT parameter between the two paths. Selectively summing and correlating of related samples to generate correlation peaks is well known in the art, such as with compositing before correlation disclosed in U.S. Pat. No. 4,686,655. Automatic peak detecting is also well known in the art, such as disclosed with reference to FIG. 6D in U.S. Pat. No. 4,686,655.

The peak delta-T parameters derived in the DETERMINE TIME DIFFERENCE operation 334. These peak delta-T parameters are generated as locus lines and then converted to range, position, or location information in the CONVERT TIME TO RANGE/LOCATION operation 336 for outputting in the OUTPUT operation 338. Program operation can be controlled by the program EXIT operation 340 to either loop back for another iteration through the range, position, and location operations along the no path N or to exit the processing along the yes path Y.

It is to be understood that the above-described embodiments are illustrative of some of the many specific embodiments that represent applications of the principles of the present invention. Clearly, numerous and varied other arrangements may be designed by those skilled in the art without departing from the scope of the invention.

What is claimed is:

1. A locating system comprising:
   a receiver for generating digital time domain signal samples related to a signal source;
   a transform processor for generating digital frequency domain signal samples in response to the digital time domain signal samples generated by said receiver;
   an adder circuit for generating the digital summed frequency domain signal samples as pseudo noise digital summed frequency domain signal samples that are suitable for correlation processing by selectively adding the plurality of digital frequency domain signal samples from the array of digital frequency domain signal sampled generated by said transform processor;
   a time difference processor for generating time difference signal samples by processing the digital summed signal samples generated by said adder circuit, said time difference processor including a correlation processor for generating the time difference signal samples by correlation processing of the pseudo noise digital summed signal samples generated by said adder circuit; and
   a location processor for generating a location parameter defining location of a signal source in response to the time difference signal samples generated by said time difference processor.

2. The system as set forth in claim 1 above, wherein said transform processor includes a fast Fourier transform processor for generating the digital frequency domain signal samples as fast Fourier transformed digital frequency domain signal samples in response to the digital time domain signal samples generated by said receiver.

3. The system as set forth in claim 1 above, wherein said system is an underwater passive surveillance system, wherein said receiver includes an underwater acoustic transducer for generating a transducer signal and a transducer circuit for generating the digital time domain signal samples related to a signal source in response to the transducer signal generated by said underwater acoustic transducer.

4. The system as set forth in claim 1 above, wherein said location processor is arranged for generating the location parameter as a range parameter defining range location of a signal source in response to the time difference signal samples generated by said time difference processor.

5. The system as set forth in claim 1 above, further comprising a selection circuit for selecting the plurality of digital frequency domain signal samples generated by said transform processor that are selectively added by said adder circuit for generating digital summed frequency domain signal samples.

6. A locating system comprising:
   a receiver for generating digital time domain signal samples related to a signal source;
   a transform processor for generating digital frequency domain signal samples in response to the digital time domain signal samples generated by said receiver;
   an adder circuit for generating the digital summed frequency domain signal samples as pseudo noise digital summed frequency domain signal samples that are suitable for correlation processing by selectively adding the plurality of digital frequency domain signal samples from the array of digital frequency domain signal sampled generated by said transform processor;
   a time difference processor for generating time difference signal samples by processing the digital summed signal samples generated by said adder circuit, said time difference processor including a correlation processor for generating the time difference signal samples by correlation processing of the pseudo noise digital summed signal samples generated by said adder circuit;
   a location processor for generating a location parameter defining location of a signal source in response to the time difference signal samples generated by said time difference processor; and
   an operator keyboard selection circuit for operator selection of the plurality of digital frequency domain signal samples generated by said transform processor that are selectively added by said adder circuit for generating digital summed frequency domain signal samples.

7. A locating system comprising:
   a receiver for generating digital time domain signal samples related to a signal source;
   a transform processor for generating digital frequency domain signal samples in response to the digital time domain signal samples generated by said receiver;
   an adder circuit for generating digital summed frequency domain signal samples by selectively adding a plurality of digital frequency domain signal samples generated by said transform processor;
   a correlation processor for generating correlated signal samples by correlating the digital summed signal samples generated by said adder circuit; and
   a location processor for generating a location parameter defining location of a signal source in response to the correlated signal samples generated by said correlation processor.

8. The system as set forth in claim 7 above, wherein said location processor is arranged for generating the location parameter as a range parameter defining range location of a signal source in response to the correlated signal samples generated by said correlation processor.

9. The system as set forth in claim 7 above, wherein said adder circuit is arranged for generating the digital summed frequency domain signal samples as pseudo noise digital summed frequency domain signal samples that are suitable for correlation processing by selectively adding the plurality of digital frequency domain signal samples from the digital frequency domain signal samples generated by said transform processor and wherein said correlation processor is arranged for for generating the correlated signal samples by processing the pseudo noise digital summed signal samples generated by said adder circuit.

10. The system as set forth in claim 7 above, further comprising an operator keyboard circuit for operator selection of the plurality of digital frequency domain signal samples from the digital frequency domain signal samples generated by said transform processor that are selectively adding by said adder circuit.

11. The system as set forth in claim 7 above, further comprising an artificial intelligence processor for automatically selecting the plurality of digital frequency domain signal samples from the digital frequency domain signal samples generated by said transform processor that are selectively adding by said adder circuit.

12. A locating system comprising:
 a receiver for generating digital time domain signal samples related to a signal source;
 a transform processor for generating digital frequency domain signal samples in response to the digital time domain signal samples generated by said receiver;
 an adder circuit for generating pseudo noise signal samples that are suitable for correlation processing by selectively adding a plurality of digital frequency domain signal samples generated by said transform processor;
 a correlation processor for generating correlated signal samples by correlating the pseudo noise signal samples generated by said adder circuit; and
 a location processor for generating a location parameter defining location of a signal source in response to the correlated signal samples generated by said correlation processor.

13. The system as set forth in claim 12 above, wherein said location processor is arranged for generating the location parameter as a range parameter defining range location of a signal source in response to the correlated signal samples generated by said correlation processor.

14. The system as set forth in claim 12 above, further comprising a selection circuit for selecting the plurality of digital frequency domain signal samples from the digital frequency domain signal samples generated by said transform processor.

15. The system as set forth in claim 12 above, further comprising an inference processor for selecting the plurality of digital frequency domain signal samples from the digital frequency domain signal samples generated by said transform processor.

16. A locating system comprising:
 a receiver for generating an array of digital time domain signal samples related to a signal source;
 a transform processor for generating an array of digital frequency domain signal samples in response to the array of digital time domain signal samples generated by said receiver;
 a selection circuit for selecting a plurality of frequency signal samples from the array of digital frequency domain signal samples generated by said transform processor;
 an adder circuit for generating summed signal samples by adding the plurality of frequency signal samples selected by said selection circuit;
 a correlation processor for generating correlated signal samples by correlating the summed signal samples generated by said adder circuit;
 a peak detector circuit for generating a time parameter defining the time relation of a peak of the correlated signal samples generated by said correlation processor; and
 a location processor for generating a location parameter defining location of a signal source in response to the time parameter generated by said peak detector circuit.

17. The system as set forth in claim 16 above; wherein said system is an underwater passive surveillance system, wherein said receiver includes an underwater analog transducer for generating an analog transducer signal, an amplifier for amplifying the analog transducer signal generated by said analog transducer, and an analog to digital converter for generating the digital time domain signal samples related to a signal source in response to the analog transducer signal amplified by said amplifier; wherein said transform processor includes a fast Fourier transform processor for generating the array of digital frequency domain signal samples as an array of Fourier transformed digital frequency domain signal samples in response to the array of digital time domain signal samples generated by said receiver; wherein said selection circuit includes an operator input device for operator selecting of the plurality of frequency signal samples from the array of Fourier transformed digital frequency domain signal samples generated by said fast Fourier transform processor; wherein said adder circuit is implemented on a digital signal processor chip for generating the summed signal samples as pseudo noise summed signal samples that are suitable for correlation processing by adding the plurality of frequency signal samples selected by said operator input device in said selection circuit; wherein said correlation processor includes a digital signal processor chip for generating the correlated signal samples by convolution processing of the pseudo noise summed signal samples generated by said adder circuit; wherein said peak detector circuit is arranged for generating the time parameter as a time difference parameter defining the time relation of a peak of the correlated signal samples generated by said correlation processor as a time difference between difference propagation paths; and wherein said location processor is programmed for generating the location parameter defining location as a range of a signal source in response to the time difference parameter generated by said peak detector circuit.

18. The system as set forth in claim 16 above, wherein said adder circuit is arranged for generating the summed signal samples as pseudo noise summed signal samples that are suitable for correlation processing by adding the plurality of frequency signal samples selected by said selection circuit and wherein said correlation processor is arranged for generating the correlated signal samples by correlating the pseudo noise summed signal samples generated by said adder circuit.

19. The system as set forth in claim 16 above, wherein said selection circuit includes an operator keyboard circuit for operator selection of the plurality of frequency signal samples from the array of digital frequency domain signal samples generated by said transform processor.

20. The system as set forth in claim 16 above, wherein said selection circuit includes an inference processor for selecting the plurality of frequency signal samples from the array of digital frequency domain signal samples generated by said transform processor.

* * * * *